(12) United States Patent
Mackic et al.

(10) Patent No.: US 12,145,143 B2
(45) Date of Patent: Nov. 19, 2024

(54) METHOD OF LOADING A TUBULAR REACTOR WITH A CATALYST TUBE ASSEMBLY, AND A CATALYST TUBE ASSEMBLY FOR A TUBULAR REACTOR

(71) Applicant: TECHNIP ENERGIES FRANCE, Nanterre (FR)

(72) Inventors: Zlatko Mackic, Zoetermeer (NL); Stephane Walspurger, Zoetermeer (NL); Antonio Farace, Zoetermeer (NL); Franciscus Van Soest, Zoetermeer (NL)

(73) Assignee: TECHNIP ENERGIES FRANCE, Nanterre (FR)

( * ) Notice: Subject to any disclaimer, the term of this patent is extended or adjusted under 35 U.S.C. 154(b) by 373 days.

(21) Appl. No.: 17/621,813

(22) PCT Filed: Jun. 26, 2020

(86) PCT No.: PCT/EP2020/068035
§ 371 (c)(1),
(2) Date: Dec. 22, 2021

(87) PCT Pub. No.: WO2020/260589
PCT Pub. Date: Dec. 30, 2020

(65) Prior Publication Data
US 2022/0234018 A1    Jul. 28, 2022

(30) Foreign Application Priority Data
Jun. 28, 2019   (EP) .................................... 19183237

(51) Int. Cl.
*B01J 8/06*    (2006.01)
*B01J 8/02*    (2006.01)
*B65G 65/00*    (2006.01)

(52) U.S. Cl.
CPC ............... *B01J 8/06* (2013.01); *B01J 8/0257* (2013.01); *B65G 65/00* (2013.01)

(58) Field of Classification Search
CPC .. B01J 8/06; B01J 8/0257; B01J 2219/32279; B01J 2219/3325; B01J 8/0035;
(Continued)

(56) References Cited

U.S. PATENT DOCUMENTS

2014/0196875 A1   7/2014  Jensen et al.

FOREIGN PATENT DOCUMENTS

CA   3041056 A1 *  5/2018  ............ B01J 8/0257
EP   0994091 A1     4/2000
(Continued)

OTHER PUBLICATIONS

International search report and Written Opin. issued in corresponding PCT application No. PCT/EP2020/068035, dated Sep. 8, 2020.

*Primary Examiner* — Saul Rodriguez
*Assistant Examiner* — Lucia Elba Rodriguez
(74) *Attorney, Agent, or Firm* — Locke Lord LLP; Christopher J. Capelli; Gabrielle L. Gelozin

(57) ABSTRACT

Method of loading a tubular reactor with a catalyst tube assembly, method of unloading a catalyst tube assembly from a tubular reactor, and catalyst tube assembly for a tubular reactor, such as a steam reformer, comprising an outer reactor tube having an inlet end and an outlet end opposite the inlet end, and including an inwardly protruding element; a centering assembly including an inner tube having an inlet end and an outlet end; a tubular boundary having a closed end and an open end.

20 Claims, 5 Drawing Sheets

(58) Field of Classification Search
CPC ........... B01J 8/067; B01J 8/002; B65G 65/00; C01B 3/38
See application file for complete search history.

(56) References Cited

FOREIGN PATENT DOCUMENTS

| | | | | |
|---|---|---|---|---|
| EP | 2223739 A1 | 9/2010 | | |
| EP | 3124111 A1 * | 2/2017 | ............. | B01J 19/24 |
| WO | 9511745 A1 | 5/1995 | | |
| WO | 2011088982 A1 | 7/2011 | | |
| WO | 2014040815 A1 | 3/2014 | | |
| WO | 2016/050520 A1 | 4/2016 | | |
| WO | WO-2018077969 A1 * | 5/2018 | ............ | B01J 8/0257 |

\* cited by examiner

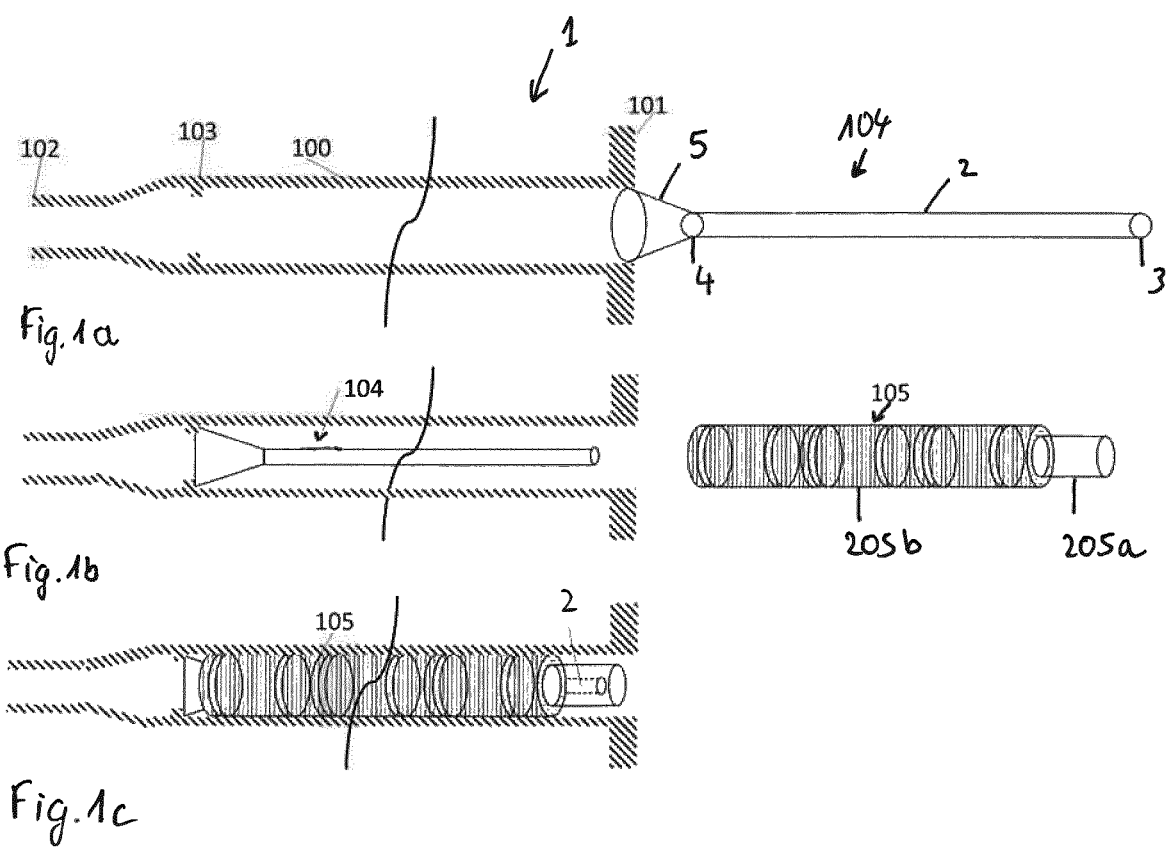

METHOD OF LOADING A TUBULAR REACTOR WITH A CATALYST TUBE ASSEMBLY, AND A CATALYST TUBE ASSEMBLY FOR A TUBULAR REACTOR

CROSS-REFERENCE TO RELATED APPLICATIONS

This application is a U.S. National Phase Application filed under 35 U.S.C. § 371, based on International PCT Patent Application No. PCT/EP2020/068035, filed Jun. 26, 2020, which application claims priority to European Patent Application No. 19183237.7 filed on Jun. 28, 2019. The entire contents of these applications are incorporated herein by reference in their entirety.

BACKGROUND OF THE INVENTION

1. Field of the Invention

The invention relates to a method of loading a tubular reactor, preferably a multi-tubular reactor, such as a steam reformer, with a catalyst tube assembly, and to a catalyst tube assembly for a tubular reactor.

2. Description of Related Art

It is known to conduct catalytic processes in multi-tubular reactors. A well known example is the catalytic process of steam reforming.

Steam reforming is a catalytic process, wherein a hydrocarbon feedstock (feed gas) is converted into a mixture of carbon monoxide and hydrogen gas (called a process gas) in the presence of a metal-based catalyst, typically nickel. The conversion reaction is strongly endothermic and needs to be conducted at high temperatures, typically at least 700° C.

Catalytic conversion of process gas may be conducted in a multi-tubular reactor of an industrial furnace or fired heater. For example, steam reforming is conducted in a steam reformer. A fired heater or industrial furnace (such as a steam reformer) essentially has two main sections: the furnace (radiant section) and the heat recovery system (convection section). The radiant section comprises a furnace chamber with burners, which may be placed on the ceiling (a top fired furnace), the floor (bottom fired furnace) and/or the side surface (side fired furnace) of the furnace chamber. The burners produce then the necessary heat for the process by combustion of fuel. The radiant section further comprises multiple tubes, wherein the catalyst is loaded, to enable sufficient heat supply to the catalyst for the endothermic catalytic reaction to occur. The tubes in the radiant section wherein the conversion reaction takes place are called catalyst tubes. Multiple catalyst tubes are typically inserted into the radiant section to provide the desired heat exchange surface. The furnace heat recovery system, also called convection section, contains a number of heat exchangers for recovering heat. The hot flue gas leaving the radiant section passes through these heat exchangers, which are typically used for preheating of feedstock, water heating and steam production.

The outlet of the catalyst tubes is the zone where the process gas reaches its highest temperature in the entire catalytic conversion process, typically over 880° C., up to 950-980° C. Accordingly, the process gas exiting the catalyst section of the catalyst tubes can be considered as a valuable high energy heat source.

The process gas exiting the catalyst tubes may also be used as a source of heat for the reforming reaction. This process may also be referred to as regenerative or recuperative catalytic conversion since it uses part of the high value heat the process gas contains when leaving the catalytic zone to provide part of the reaction heat. In recuperative catalytic conversion, heat exchange takes place between the hot process gas exiting the catalytic zone of the catalyst tubes and the process gas being converted in the upstream part of the catalytic zone. This strategy can be used advantageously to decrease the external heat supply (through the combustion of fuel and waste gas in the fire box), to increase the fire box efficiency and to reduce the cost of heat exchange equipment needed for the heat recovery at the outlet of the reformer and in the convection section. An example of the process of recuperative catalytic conversion in reforming is for example known from WO2011/088982. In this case, the process is referred to as recuperative reforming.

Two general types of steam reformers can be distinguished with respect to the way the catalyst tube inlets and outlets are oriented in the furnace chamber.

In steam reformers of the first type (type 1), both the process gas inlets and process gas outlets of the catalyst tubes are located at the same side of the furnace. Each catalyst tube is inserted into the furnace chamber, such that it extends through only one furnace wall. The gas will enter the furnace chamber through the one furnace chamber wall, flow through the furnace chamber, and then return to the same furnace wall and exit the furnace chamber again. Generally, the catalyst tubes are designed such that the process gas flows in a U-shaped path through the furnace chamber. An example of this type of steam reformer is for example given in EP 2 223 739 A1.

In steam reformers of the second type (type 2), the catalyst tube inlets are located at one end of the furnace chamber, while the catalyst tube outlets are located at the other opposite end of the furnace chamber. In type 2 reformers, the catalyst tubes are inserted into the furnace chamber in such a way that they extend through two opposite furnace walls. Generally, the catalyst tubes are designed as straight elongated tubes, such that the gas flows through the furnace chamber from one end to the other in a relatively straight path. An example of this type of steam reformer is for example given in WO 2014/040815.

It is known to apply the concept of recuperative reforming in type 1 steam reformers. For this purpose, a specific tube design was made based on Field-tube (also known as a Bayonet tube) reactors. In this design, the catalyst tube consists of an outer tube that is closed at one outer end and further an inner tube that is open at both its outer ends, which inner tube is received coaxially in the outer tube. This design is for example described in WO 95/11745 and US 2014/0196875. The design relies on the tube in a tube concept where an annular arrangement of the reactor allows for heat exchange between the hot process gas exiting the catalytic bed and the process gas being converted in the upstream part of the catalytic bed.

It has also been attempted to apply the concept of recuperative reforming in steam reformers of the second type, as has been disclosed in WO 2018/077969. In one design the catalyst tube assembly can include an outer tube, an inner tube which is located coaxially in the outer tube, and an annular barrier placed coaxially within the outer tube and around the inner tube, such that two coaxial annular channels are formed around the inner tube. The ends of the outer and inner tubes are closed in such a way that process gas can enter a first annular channel between the outer tube and the annular barrier at a first end, pass into a second annular channel between the annular barrier and the inner tube at a second end opposite the first end so that the process gas can flow through the second annular channel counter-currently with respect to the flow in the first annular channel. At the first end, the process gas can then pass from the second annular channel into the inner tube, and the process gas can exit the inner tube of the tubular reactor at the second end. The first annular channel can include the catalyst material. Other possible designs are also described in WO 2018/077969.

A problem of such a catalyst tube assembly allowing recuperative reforming in steam reformers of the second type is a relatively difficult procedure of loading the catalyst tube assembly including the catalyst material into the steam reformer. On the one hand, some clearance between the catalyst tubes and the outer reactor tube is needed to facilitate the mounting of these tubular structures, but on the other hand, leakage of process gas between the different tubes and channels needs to be minimized to ensure an optimal heating of the process gas. The leakage rate may not necessarily need to be zero, but needs to be known and controlled, since gas tightness between an end of the catalytic bed and an exit of the catalytic tube is a critical aspect to ensure good functioning of a recuperative reactor.

SUMMARY OF THE INVENTION

It is an aim of the present invention to solve or alleviate one or more of the above-mentioned problems. Particularly, the invention aims at providing an improved and simplified method of loading a catalyst tube assembly while allowing a relatively reliable sealing within the assembly.

To this aim, according to a first aspect of the present invention, there is provided a method of loading a tubular reactor with a catalyst tube assembly characterized by the features of claim 1. In particular, the method includes the steps of providing a tubular reactor, such as a steam reformer tubular reactor, including an outer reactor tube having an inlet end, and an outlet end opposite the inlet end, and including an inwardly protruding element; providing a tubular boundary having a closed end and an open end; providing a centering assembly including an inner tube having an inlet end and an outlet end, which includes at least one sealing member. The method further includes the steps of providing catalyst structures; mounting said catalyst structures around said tubular boundary; inserting said centering assembly substantially coaxially into the outer reactor tube, from the inlet end, until the at least one sealing member engages the inwardly protruding element; and mounting said tubular boundary substantially coaxially over said centering assembly. In this way, only three mounting steps are needed to load a tubular reactor with a catalyst tube assembly including the catalyst structures, which can significantly reduce downtime of a tubular reactor for catalyst loading or replacement. At the same time, the at least one sealing member engaging the inwardly protruding element can ensure a reliable sealing allowing a correct flow of process gas through the catalyst tube assembly, since the sealing member can minimize and preferably avoid process gas leaking from the first annular channel directly to the outlet end of the tubular reactor, i.e. without going through the second annular channel and the inner tube. The inwardly protruding element is preferably located along an inner side or perimeter of the outer reactor tube. The catalyst structures that are to be mounted around said tubular boundary are annular catalyst structures, e.g. ring-shaped. When mounted the annular catalyst structures may be understood to form tubular catalyst structures or blocks of annular catalyst structures, e.g. as shown and described in relation to FIGS. 1, 2 and 4. Advantages of providing the catalyst tube assembly with annular catalyst structures include accurate, e.g. homogeneous, loading of the reactor with catalyst, thereby mitigating problems such as uneven process gas flow distribution, that may be associated to loading an elongate and narrow space with loose pellets, particularly if the reactor is positioned horizontally.

Alternatively, or in addition, the catalyst structures may be composed of various parts, which together form or are pre-formed into an annular structure, for example half rings or other shapes, or even catalyst particles, e.g. pellets, which are kept together, and as an assembly, form an annular catalyst structure corresponding to an inner shape of the first annular channel. In contrast, filling the first annular channel directly with pellets, e.g. by random dropping or pouring loose particles or pellets, was found to be less preferred, e.g. in terms of limited space available and/or in terms of loading homogeneity, which may be comparatively poor when the tube is filled by randomly dropped loose particles or pellets and thus may lead to unequal distribution of flow resistance. In this respect reference can made to EP0994091A1 and WO 2018/077969 disclosing the use of catalyst pellets to load a tubular reactor.

The centering assembly may preferably be inserted into the outer reactor tube before the tubular boundary is mounted over the centering assembly. This can allow a good positioning and centering of the centering assembly within the outer reactor tube.

Alternatively, the tubular boundary may be mounted over the centering assembly before the centering assembly is inserted into the outer reactor tube, in which case the tubular boundary may for example be welded to the centering assembly, and may both be inserted into the outer reactor tube as a whole.

The annular (tubular) catalyst structures may preferably be mounted around the tubular boundary before mounting said tubular boundary over the centering assembly. In this way, the tubular boundary and the tubular catalyst structures can be handled together as a single assembly for the mounting over the centering assembly, the centering assembly being already inside or still outside the outer reactor tube.

Alternatively, the tubular boundary may be mounted over the centering assembly before the annular catalyst structures are mounted around the tubular boundary, which may advantageous for example when the tubular reactor is in a substantially vertical position.

By loading the tubular reactor with a catalyst tube assembly as disclosed herein, i.e. with a method comprising: inserting said centering assembly substantially coaxially into the outer reactor tube until the at least one sealing member engages the inwardly protruding element; mounting said annular catalyst structures around said tubular boundary; and mounting said tubular boundary substantially coaxially over said centering assembly, fluid flow inside the reactor may be understood to be essentially (at least mostly) arranged in an axial direction (axial flow). Thus the reactor may, for example, be arranged to direct process gasses along a zigzagging path formed of a succession of radially more inward channels. In this respect reference can be made to for example FIGS. 1, 3 and 5 and the description thereof disclosing a reactor including a succession of radially more inward channels that direct process gasses through the reactor in an axial direction. It is known to the person in the art that radial flow reactor designs advantageously limit the exotherm, e.g. during operating the reactor under mildly to highly exothermic process conditions. As such, radial flow reactor design reduces the chance of overheating and/or altering selectivity or catalyst lifetime. In contrast, the present application, may be particularly suitable for applications benefitting from maximized heat transfer. For example, in steam reforming reactions heat transfer is preferably significantly higher, or even as high as possible, to drive the reaction forward. This being allowed since operating conditions are less restricted as the steam reforming catalyst it known for typically being quite resilient to severe temperature conditions. Therefore, the inventors found it not necessary to obtain such a tight control as what a radial flow reactor would offer. Reference is made to WO2016/050520, wherein a reactor is loaded with catalyst through a series of filled cans, such that reagents follow a series of predominantly radially oriented flow paths and as such is believed to be predominantly suitable for mildly exothermic reactions.

Additionally, the (mostly) axial flow design may be supplemented by a structural arrangement that locally forces the gas flow radially against the catalytic annulus boundary such as to enhance the heat transfer. This can be achieved by providing the annular structure with means such as to obtain a local radial flow deviation. Suitable means include fins or other or further surface structuring provided to the annular structure, preferably to an exterior face of one or more of the annular catalyst structures. As such, the catalyst assembly as loaded in the tubular reactor may be understood to provide an arrangement to direct process gasses along zigzagging path that ensures maximum contact of gasses with catalyst surface in a mostly overall axial direction while increasing heat transfer with the reactor boundaries by providing means to the annular structure to ensure (local) radial mixing.

It may be preferred that ring-shaped elements are mounted around the catalyst structures radially compressing said catalyst structures. Said ring-shaped elements may for example be made of ash free adhesive paper, rice paper, or of a suitable metal. The ring-shaped elements can have a double function: on the one hand, they allow blocking of the annular catalyst structures (tubular catalyst structures) on the tubular boundary such that the tubular boundary with the tubular catalyst structures can be handled as a whole, and on the other hand, the ring-shaped elements allow a compression of the catalyst structures, i.e. a reduction of their radial length, such that insertion into the outer reactor tube may be facilitated, in that a margin can be taken into account for tolerances in manufacturing, welding, etcetera.

The ring-shaped elements may preferably be removed or destructed after insertion into the outer reactor tube of the tubular boundary on which the tubular catalyst structures are mounted. This may for example be done mechanically, or by destruction through a raise in temperature or combustion. In his way, the catalyst structures can substantially entirely fill the first annular channel between the outer reactor tube and the tubular boundary. When not removed or destructed, the ring-shaped elements can further serve as the means, or as additional means, to obtain a local radial flow deviation.

Another aspect of the invention provides a method of unloading a catalyst tube assembly from a tubular reactor as defined by the features of claim 8. In particular, the method comprises the steps of providing a tubular reactor loaded with a catalyst tube assembly following the method according as described above, removing, in particular in a sliding manner, the tubular boundary from the tubular reactor, in particular from the outer reactor tube, and removing, in particular, sliding out, the centering assembly from the tubular reactor, in particular from the outer reactor tube. Due to thermal cycles and expansion resulting from thermal behaviour of a chemical reaction in the tubular reactor, the catalyst material may deform significantly during catalyst lifetime, and may therefore become relatively difficult to unload. By first removing the tubular boundary, the catalyst structures, which are present preferably in the first tubular channel, are free to expand radially inwardly, relaxing tension, and may then be removed more easily, for example by retracting or sliding out the centering assembly.

The sealing member attached to the outlet end of the inner tube of the centering assembly, which may preferably have an radially outwardly extending shape, can cause the catalyst structures to slide out together with the centering assembly. In this way, the tubular reactor can be unloaded relatively easily in only two steps.

In a preferred method of unloading, the step of removing the tubular boundary may cause the centering assembly to be removed as well, for example when the tubular boundary is fixedly attached to the sealing member which is directly attached to the outlet end of the inner tube of the centering assembly. In such a case, the unloading of the tubular reactor may even be done in a single step of retracting the entire assembly of the tubular boundary with the centering assembly including the catalyst structures via the inlet end of the outer reactor tube.

Another aspect of the invention provides a catalyst tube assembly as defined by the features of claim 10. In particular, the catalyst tube assembly for a tubular reactor, such as a steam reformer tubular reactor of the second type, comprises an outer reactor tube having an inlet end and an outlet end opposite the inlet end, and includes an inwardly protruding element. The inwardly protruding element is preferably located along an inner side or perimeter of the outer reactor tube. The assembly further comprises a centering assembly including an inner tube having an inlet end and an outlet end, and also comprises a tubular boundary having a closed end and an open end. The tubular boundary is configured to extend substantially coaxially within the outer reactor tube and substantially coaxially around the inner tube, such that the catalyst tube assembly includes a first annular channel between the outer reactor tube and the tubular boundary, and a second annular channel between the tubular boundary and the inner tube. The second annular channel is in fluid connection with the first annular channel near the open end of the tubular boundary, and in fluid connection with the inner tube at the closed end of the tubular boundary. In an inventive way, the outlet end of the inner tube includes at least one sealing member configured to be in sealing engagement with the inwardly protruding element of the outer reactor tube. In this way, leaking of process gas from the first annular channel directly towards the outlet end of the outer reactor tube without passing through the second annular channel and through the inner tube, can be minimized, or more preferably, avoided. The at least one sealing member may optionally also provide a sealing engagement with an inner side of the outer reactor tube. The sealing engagement between the outlet end of the inner tube and the inwardly protruding element may be obtained by a single sealing member, or by a plurality of sealing members, optionally combined with intermediate elements, for example to compensate for constructional tolerances. In case of a plurality of sealing members, the sealing members need not each sealingly engage both the outlet end of the inner tube and the inwardly protruding element. They may also form a row of sealing members, of which a first one engages the outlet end of the inner tube, a second one engages the inwardly protruding element, and of which other sealing members are optionally positioned between said first and second sealing members, such that the row of sealing members form a sealing between the outlet end of the inner tube and the inwardly protruding element. So the process gas can enter the tubular reactor via the inlet end into the first annular channel between the outer reactor tube and the tubular boundary, where the tubular catalyst structures are positioned. The process gas can then pass through openings in the tubular boundary near the open end of the tubular boundary into the second annular channel between the tubular boundary and the inner tube, to flow counter-currently with respect to the flow in the first annular channel through the second annular channel towards the closed end of the tubular boundary, where the process gas can pass from the second annular channel into the inner tube and flow towards the outlet end of the outer reactor tube, again counter-currently with respect to the flow in the second annular channel. The process gas thus follows a zigzagging path through a succession of radially more inward channels, which is only possible when a reliable sealing member is provided preventing the process gas from taking a short-cut through the assembly. The first annular channel is preferably configured to receive or include catalyst material, in particular catalyst structures, more preferably annular catalyst structures as described herein above. The catalyst structures may be composed of various parts, which together form an annular structure, for example half rings or other shapes, or even particles which may be kept together, and as an assembly, form an annular catalyst structure preferably corresponding to an inner shape of the first annular channel. Alternatively, another channel of the catalyst tube assembly may be filled with catalyst material.

The protruding element may for example be a catalyst grid. A catalyst grid is usually present in an existing tubular reactor and is usually configured to hold in place randomly packed beds of catalyst particles. Such a grid, extending over substantially an entire cross-section of the outer reactor tube, may be advantageously used to support the centering assembly and to engage the at least one sealing member of said centering assembly. Alternatively, if such a grid is not present, or in case of a novel reactor tube, an inner side of the outer reactor tube may be provided with a dedicated protuberance or protruding element, for example by machining or welding. Said dedicated protruding element need not extend over a cross-section of the outer reactor tube, and can for example be a inwardly protruding ridge along an inner circumference of the outer reactor tube. Such a catalyst grid or other protruding element can locally slightly decrease an inner diameter of the outer reactor tube, such that the sealing member of the centering assembly can provide effective sealing with said protruding element while still allowing the centering assembly to be inserted into the outer reactor tube relatively easily, i.e. limiting the risk of damage to the sealing member due to contact between the sealing member and an inner side of the outer reactor tube during insertion of the centering assembly.

The at least one sealing member can advantageously have a conical shape, a ring-like shape, or a cylindrical shape. In case of a conical shape, an outlet end of the inner tube may for example be fixedly connected to the conical sealing member, for example through welding, such that the sealing member can provide a conical widening of the inner tube. An outer diameter of the conical sealing member at its largest end may be only slightly smaller than an internal diameter of the outer reactor tube, such that it can still be inserted relatively easily into the outer reactor tube, but can at the same time sealingly engage the protruding element in the outer reactor tube, either directly or indirectly via a further sealing member. In case of a ring-like sealing member, an outlet end of the inner tube may for example be fixedly connected to the ring-like sealing member. Alternatively, a ring-like sealing member may be fixedly attached to a conical sealing member which is fixedly connected to the outlet end of the inner tube. In analogy with the conically shaped sealing member, an outer diameter of the ring-like sealing member may be only slightly smaller than an internal diameter of the outer reactor tube. The ring-like sealing member may engage the protruding element directly, or via another sealing member. A cylindrically shaped sealing member may for example be used as an additional sealing member in combination with one or more of a conical or a ring-like shaped sealing member, and may directly engage the protruding element of the outer reactor tube.

An external diameter of the at least one sealing member may preferably be smaller than an internal diameter of the outer reactor tube near the inwardly protruding element, which can allow relatively easy insertion of the centering assembly into the outer reactor tube, and which can prevent damage to the sealing member due to contact between the sealing member and an inner side of the outer reactor tube during insertion of the centering assembly into the outer reactor tube. At the same time, such a diameter of the sealing member can facilitate centering the centering assembly within the outer reactor tube.

The inner tube may advantageously include spacers mounted on an external side of the inner tube and configured to maintain a gap between the inner tube and the tubular boundary. The gap can thus form the second annular channel. These spacers may be embodied as local outward protrusions from the inner tube, and may be of many possible geometries, which geometry may be chosen to enhance for example the flow pattern of the process gas flowing through the annular channels, and thus enhance convectional heat transfer between the second and the first annular channels. Alternatively, said spacers may also be mounted to an inner side of the tubular boundary, or to both the inner tube and the tubular boundary. Apart from centering the tubular boundary around the inner tube, said spacers also have a stiffening effect on the catalyst tube assembly. Since the tubular boundary and the inner tube may be relatively long, they may both bend under the effect of gravity, or by elastic deformation, for example due to heat. The spacers can stiffen the assembly and help in preventing the assembly from bending. As such, the installation and loading of the outer reactor tube may therefore also be possible in a horizontal position of the catalyst tube assembly.

The tubular boundary may be fixedly attached to the at least one sealing member, for example welded, or otherwise attached to the at least one sealing member. In case of a plurality of sealing members, the tubular boundary may be fixedly attached to the sealing member which is directly attached to the outlet end of the inner tube. Such a fixed attachment can provide a larger assembly of the centering assembly with the tubular boundary which can be manipulated as a whole, for example in a loading or unloading method as described above.

BRIEF DESCRIPTION OF THE DRAWINGS

The present invention will be further elucidated with reference to figures of exemplary embodiments. Corresponding elements are designated with corresponding reference signs.

FIGS. 1a-1c show a schematic overview of loading a tubular reactor with a catalyst tube assembly following a first embodiment of the method according to an aspect of the invention;

DETAILED DESCRIPTION

Figures 2A, 2B, 2C:
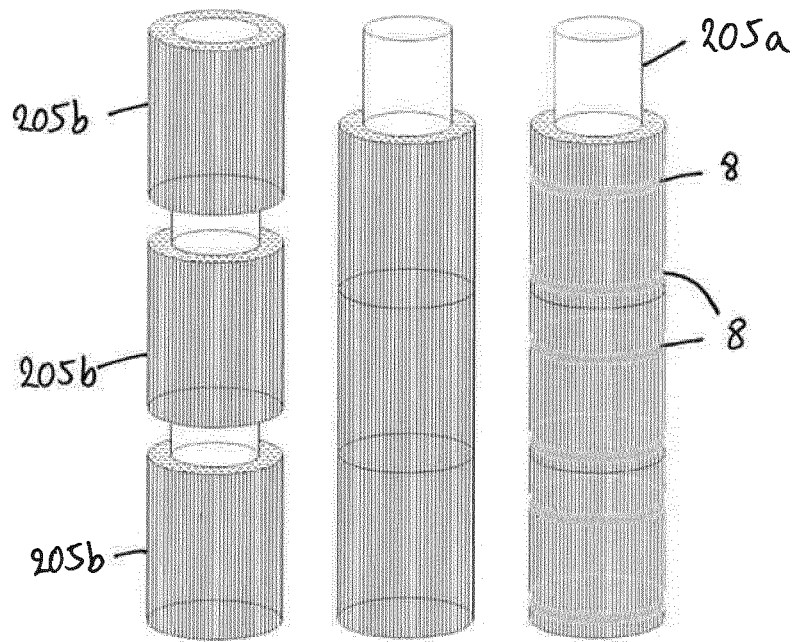
FIGS. 2a-2c show a schematic overview of the step of mounting catalyst structures around the tubular boundary according to the method of an aspect of the invention.

FIGS. 1a-1c show a schematic overview of loading a tubular reactor with a catalyst tube assembly following a first embodiment of the method according to an aspect of the invention. The sequence of the various steps of the method of loading a tubular reactor with a catalyst tube assembly may be varied, for example in function of the orientation of the tubular reactor, or of the type of structure to be loaded. In a first step, illustrated in FIG. 1a, a tubular reactor 1, such as a steam reformer, is provided. The tubular reactor 1 includes an outer reactor tube 100 having an inlet end 101 and an outlet end 102 opposite the inlet end 101, and includes an inwardly protruding element 103. Also a centering assembly 104 is provided. The centering assembly 104 includes an inner tube 2 having an inlet end 3 and an outlet end 4, wherein the outlet end 4 of the inner tube 2 includes at least one sealing member 5. In this embodiment, the sealing member 5 is a conically shaped sealing member, which is attached, for example welded, to an outlet end 4 of the inner tube 2. In the first step, said centering assembly 104 is now inserted substantially coaxially into the outer reactor tube 100 until the at least one sealing member 5 engages the inwardly protruding element 103, which is shown in FIG. 1b. Insertion is done via the inlet end 101 of the outer reactor tube 100, and with the sealing member 5 towards the outlet end 102 of the outer reactor tube 100. In a next step, a tubular boundary 205a is provided, the boundary having a closed end 6 and an open end 7. Also catalyst structures 205b, which in this case are annular catalyst structures, are provided and are mounted around said tubular boundary 205a to form an assembly 105, which can be manipulated as a whole, which step is explained in more detail in FIGS. 2a-2c. Then said tubular boundary 205a, including the annular catalyst structures 205b, is mounted substantially coaxially over said centering assembly 104, which is already positioned within the outer reactor tube 100, as shown in FIG. 1c.

FIGS. 2a-2c show a schematic overview of the step of mounting catalyst structures around the tubular boundary according to the method of an aspect of the invention. In a standard catalyst application, the active species of the catalyst is usually dispersed over a support structure, which can be made of small ceramic components, such as pellets, spheres, rings, which easily fit in the reactor tubes and which are packed randomly. In catalyst structures, the support structure is composed of a single or multiple elements of solid structure over which the active species are dispersed. The shape and size of this support structure can be chosen in function of the specific reactor. In the present case, a plurality of blocks of annular catalyst structures 205b have been chosen for the tubular reactor 1. The catalyst structures 205b can first be inserted mounted over the tubular boundary 205a, as shown in FIG. 2a, and can then be stacked together (FIG. 2b), optionally with intermediate elements (not shown) in between these blocks to enhance heat and mass transfer. In a third step, the catalyst structures 205b may be blocked on an outer surface of the tubular boundary 205a, for example by using ring-shaped elements 8 which may be mounted around the annular catalyst structures and can radially compress said catalyst structures 205b. These ring-shaped elements 8 may for example be made of ash free adhesive paper, rice paper, or of metal, which can expand with the catalyst structures at hot conditions, and can thus minimize the gap between the structures and an inner side of the outer reactor tube 100. So the ring-shaped elements 8 can at the same time block the structures onto the tubular boundary 205a to form an assembly 105, and compress the structures to facilitate insertion of the structures into the outer reactor tube 100. Once the assembly 105 of the annular catalyst structures 205b mounted on the tubular boundary 205a has been positioned in the outer reactor tube 100, the ring-shaped elements 8 may be removed, for example mechanically, or for example by destruction through combustion or temperature raise.

Figure 3A:
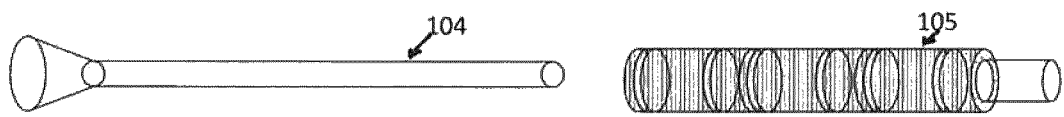
FIGS. 3a-3c show a schematic overview of loading a tubular reactor with a catalyst tube assembly following a second embodiment of the method according to an aspect of the invention.
Figure 3B:
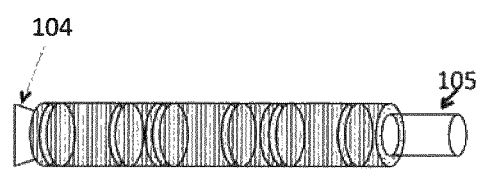
Figure 3C:
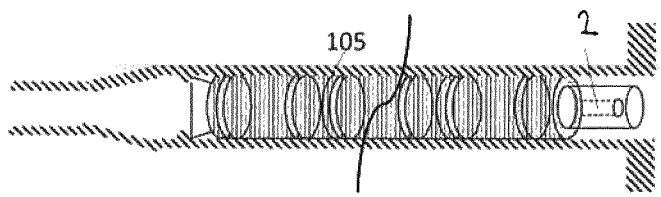

FIGS. 3a-3c show a schematic overview of loading a tubular reactor with a catalyst tube assembly following a second embodiment of the method according to an aspect of the invention. In the present sequence, the mounting of the catalyst structures 205b around the tubular boundary 205a, as explained just before, can be done first (FIG. 3a), and the assembly 105 of the catalyst structures 205b mounted on the tubular boundary 205a can be mounted over the centering assembly 104 (FIG. 3b) before the centering assembly 104 is inserted into the outer reactor tube 100, as is shown in FIG. 3c.

Figure 4A:
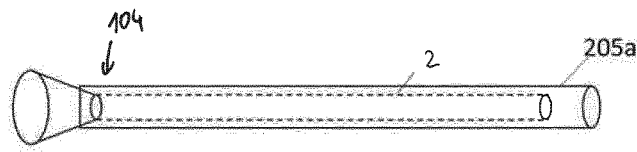
FIGS. 4a-4d show a schematic overview of loading a tubular reactor with a catalyst tube assembly following a third embodiment of the method according to an aspect of the invention.
Figure 4B:
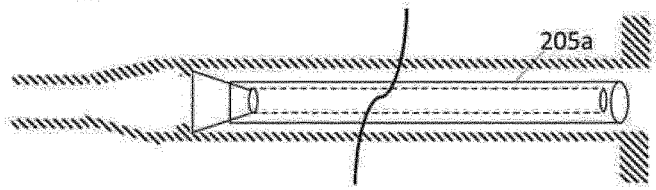
Figure 4C:
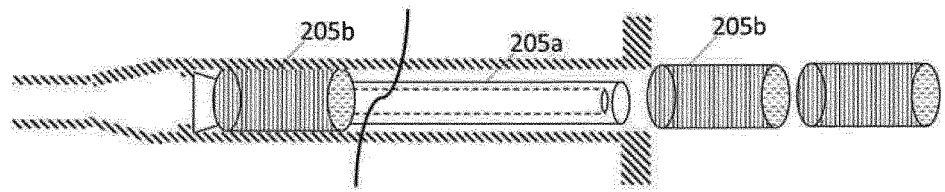
Figure 4D:
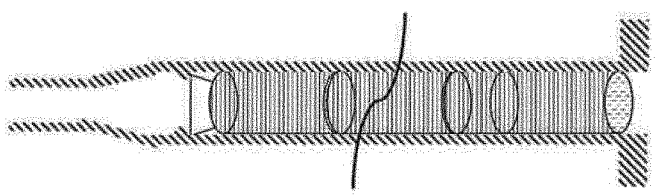

FIGS. 4a-4d show a schematic overview of loading a tubular reactor with a catalyst tube assembly following a third embodiment of the method according to an aspect of the invention. In this sequence, the catalyst structures 205b can be mounted to the tubular boundary 205a at a later stage compared to the previous sequences as illustrated in FIGS. 1a-1c and 3a-3c, which can be advantageous for loading of the tubular reactor in a vertical position. In a first step, the tubular boundary 205a can be mounted over the centering assembly 104, as shown in FIG. 4a. Then the whole of the centering assembly 104 and the tubular boundary 205a can be inserted into the outer reactor tube 100 (FIG. 4b). In a next step, annular catalyst structures are loaded one after another into the outer reactor tube 100, as shown in FIG. 4c, in particular into a first annular channel between an inner side of the outer reactor tube and the tubular boundary 205a, until the outer reactor tube 100 is filled up until the inlet end 101 of the outer reactor tube 100, as shown in FIG. 4d. In case of vertical loading of a tubular reactor according to the method as presented in FIGS. 4a-4d, although less preferred, even a non-structured catalyst, such as catalyst particles which are not held together as a structure, might be inserted into the first annular channel 11.

Figure 5:
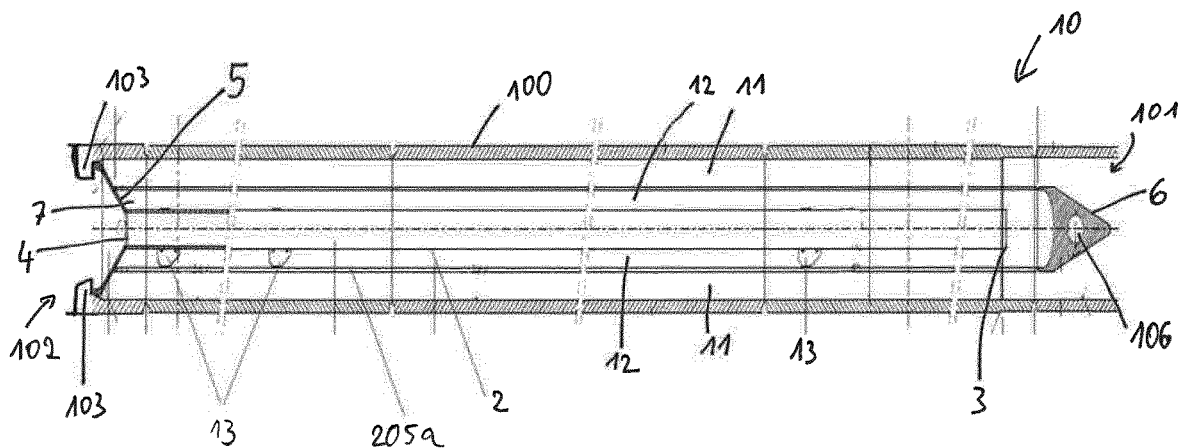
FIG. 5 shows a schematic longitudinal cross-section of an embodiment of a catalyst tube assembly according to an aspect of the invention.

FIG. 5 shows a schematic longitudinal cross-section of an embodiment of a catalyst tube assembly according to an aspect of the invention. The catalyst tube assembly 10 comprises an outer reactor tube 100 having an inlet end 101 and an outlet end 102 opposite the inlet end 101, and including an inwardly protruding element 103. The catalyst tube assembly 10 further comprises a centering assembly 104 including an inner tube 2 having an inlet end 3 and an outlet end 4, and a tubular boundary 205a having a closed end 6 and an open end 7. Once a tubular reactor, such as a steam reformer, has been loaded with the catalyst tube assembly, the tubular boundary 205a extends substantially coaxially within the outer reactor tube 100 and substantially coaxially around the inner tube 2 of the centering assembly 104, such that the catalyst tube assembly 10 includes a first annular channel 11 between the outer reactor tube 100 and the tubular boundary 205a, and a second annular channel 12 between the tubular boundary 205a and the inner tube 2 of the centering assembly 104. The second annular channel 12 is in fluid connection with the first annular channel 11 near the open end 7 of the tubular boundary 205a, for example through openings 14 (see FIGS. 6-10) in a side wall of the tubular boundary 205a. The second annular channel 12 is also in fluid connection with the inner tube 2 at the closed end 6 of the tubular boundary 205a, where a closure, for example an end cap, can prevent process gas from exiting the catalyst tube assembly via the inlet end 101 of the outer reactor tube 100, and allows the gas to enter the inner tube 2 of the centering assembly 104 via the inlet end 3 of the inner tube 2. Process gas entering the tubular reactor 1 via the inlet end 101 of the outer reactor tube 100 can thus pass through the catalyst tube assembly 10 in a zigzagging way through a succession of concentric channels from a first annular channel 11 which is positioned radially outwardly via a second annular channel 12 positioned radially more inwardly into an inner tube 2 to the outlet end 102 of the outer reactor tube 100, which trajectory has proven to be relatively efficient in terms of internal heat recirculation, in particular in heat transfer between gas flowing in the second annular channel 12 and the first annular channel 11, where the catalyst is positioned. The outlet end 4 of the inner tube 2 includes at least one sealing member 5 configured to be in sealing engagement with the inwardly protruding element 103 of the outer reactor tube 100, which will be explained and shown in more detail hereafter. The inner tube 2 of the centering assembly 104 can also include spacers 13 mounted on an external side of the inner tube 2 and configured to maintain a gap between the inner tube 2 and the tubular boundary 205a. The shape, size and material of these spacers may for example be chosen in function of a desired gas flow pattern. They may for example be welded onto the external side of inner tube 2, but alternatively, they might also be mounted to an inner side of the tubular boundary 205a or to both of the inner tube 2 and the tubular boundary 205a. Since a length of the centering assembly 104 and the tubular boundary 205a may be relatively long in comparison to a diameter of each of these same tubes, the spacers may also help in stiffening the catalyst tube assembly. The centering assembly and the tubular boundary may for example have a length between more or less 6 to more or less 20 m, or more preferably between more or less 10 to more or less 14 m, whereas a length to diameter ratio may be comprised between substantially 40-600. An internal diameter of the outer reactor tube may for example be approximately 100 mm or approximately 115 mm or more or less. An external diameter of the tubular boundary may for example vary between approximately 50-75 mm or more or less, and an external diameter of the inner tube may for example vary between approximately 25-50 mm or more or less. The choice for a specific diameter may for example depend on a temperature or pressure needed in an application, or on other process parameters. In an advantageous way, the closed end 6 of the tubular boundary 205a, which may for example be embodied as an end cap, may advantageously include gripping means 106 configured to be engaged by an external tool to manipulate the tubular boundary 205a, for example for loading or unloading the tubular boundary 205a. In the present embodiment shown in FIG. 5, the end cap of the closed end 6 includes a hole, which can be gripped by for example an unloading tool. Also the inner tube 2 could include gripping elements (not shown), such as holes or others, for example near the inlet end 3 of the inner tube 2, to facilitate removal of the centering assembly from the outer reactor tube 100. Other configurations of gripping means are possible as well, such as outwardly protruding elements, a handle, or any other suitable gripping means known to the person skilled in the art. To unload the tubular reactor 10, the tubular boundary 205a may first be removed from the tubular reactor 10, in particular from the outer reactor tube 100, for example by gripping the gripping means 106 on an end cap of the closed end 6 of the tubular boundary 205a. Then the centering assembly 104 may be removed from the tubular reactor 10, in particular from the outer reactor tube 100, preferably in a sliding manner. An outwardly extending shape of the sealing member 5 can then cause the catalyst structures to be dragged out of the outer reactor tube 100. In case the tubular boundary 205a is fixedly attached to the sealing member 5, the whole assembly of the tubular boundary 205a with the centering assembly 104 including the catalyst structures 205b may be unloaded from the tubular reactor 10 in a single step by gripping gripping means at a closed end 6 of the tubular boundary 205a and retracting the entire assembly of the tubular boundary with the centering assembly including the catalyst structures via the inlet end 101 of the outer reactor tube 100.

Figure 6:
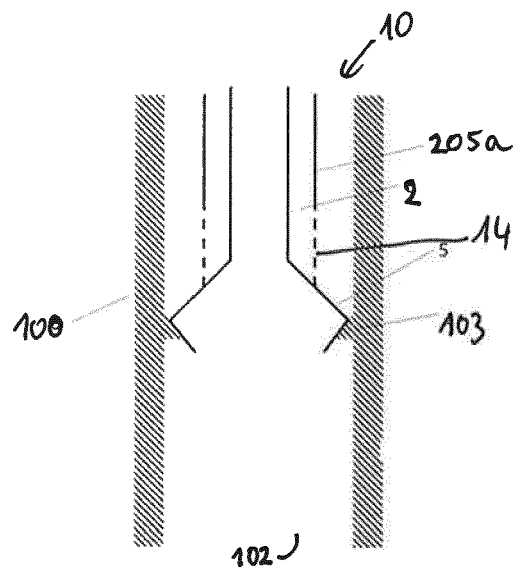
FIG. 6 shows a schematic partial longitudinal cross-section of a second embodiment of a catalyst tube assembly according to an aspect of the invention.

FIG. 6 shows a schematic partial longitudinal cross-section of a second embodiment of a catalyst tube assembly according to an aspect of the invention. Here we focus on an area close to the outlet end 102 of the outer reactor tube 100 and the outlet end 4 of the inner tube 2, for example of a catalyst tube assembly 10 as shown in FIG. 5. In this embodiment, which may be suitable for new tubular reactors without a catalyst grid, a protruding element 103, embodied as a protuberance, which may for example be an annular ridge protruding towards an interior of the outer reactor tube 100, may be welded or machined to an inner side of the outer reactor tube 100. The location of the protuberance may be chosen according to the location of the tubular reactor in a furnace, for example near a furnace floor, or near a radiant chamber boundary. The sealing member 5 is a conical sealing member, which may be welded, or otherwise attached, to an outlet end 4 of the inner tube 2 of the centering assembly 104. An external diameter of the sealing member 5, in particular of the largest end of the cone, may be chosen a little smaller than an internal diameter of the outer reactor tube 100 near the inwardly protruding element 103, such as to allow relatively easy inserting of the centering assembly 104 into the outer reactor tube 100, and at the same time allow a sealing engagement between the conical sealing member 5 and the protuberance 103. Optionally, the conical sealing member 5 may include a retracting edge, which can facilitate centering the centering assembly 104 on the protruding element 103, on top of the centering through a well chosen diameter of the sealing member. The sealing engagement of the sealing member 5 with the protruding element 103 prevents process gas from passing from the first annular channel directly to the outlet end of the outer reactor tube without passing through the second annular channel 12 and the inner tube 2 of the centering assembly 104. At the same time, an external side of the conical sealing member 5 can support the open end 7 of the tubular boundary 205a. Said open end 7 may or may not be welded, or otherwise attached, to the sealing member, depending on the way of loading the catalyst tube assembly. So the sealing member 5 can also close the open end 7 of the tubular boundary 205a. The fluid connection between the first and the second annular channel may then be established through openings 14, for example slots or holes, in a side wall of the tubular boundary 205a near the open end 7.

Figure 7:
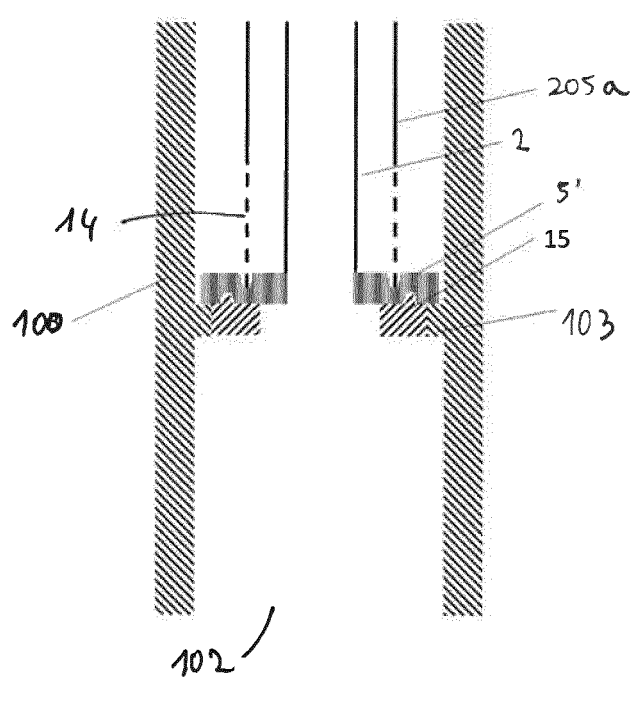
FIG. 7 shows a schematic partial longitudinal cross-section of a third embodiment of a catalyst tube assembly according to an aspect of the invention.

FIG. 7 shows a schematic partial longitudinal cross-section of a third embodiment of a catalyst tube assembly according to an aspect of the invention. In comparison with the embodiment of FIG. 6, the most important difference is that, instead of having a conical sealing member, the sealing member 5' may have a ring-like, or annular, shape. For centering purposes, the sealing member 5' may optionally include an additional slot or groove, which is configured to receive a corresponding lip 15 which may be welded on the protruding element 103. Alternatively, the sealing member may include a lip, and the protruding element a corresponding groove to receive said lip. Other features, such as the attachment of the sealing member to the inner tube 2, or the support of the tubular boundary 205a on the sealing member, are similar to the previous embodiment.

Figure 8:
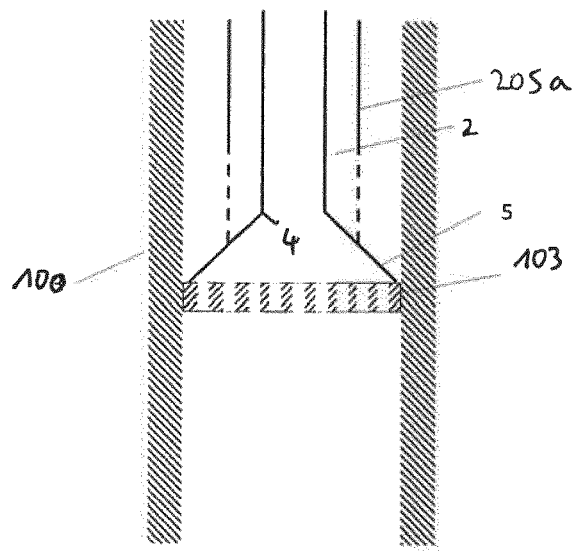
FIG. 8 shows a schematic partial longitudinal cross-section of a fourth embodiment of a catalyst tube assembly according to an aspect of the invention.

FIG. 8 shows a schematic partial longitudinal cross-section of a fourth embodiment of a catalyst tube assembly according to an aspect of the invention. Contrary to the preceding embodiments of FIGS. 6 and 7, the embodiment of FIG. 8 is configured for use in a tubular reactor having a catalyst grid. Instead of using the catalyst grid 16 to support a randomly packed bed of catalyst material, the catalyst grid 16 can form the protruding element 103 of the outer reactor tube 100. The sealing member 5 can thus make a sealing engagement with said catalyst grid 16 to control and preferably prevent leaking in the reactor tube. Other features are similar to the features of the embodiment shown in FIG. 6, such as for example the conical shape of the sealing member 5.

Figure 9:
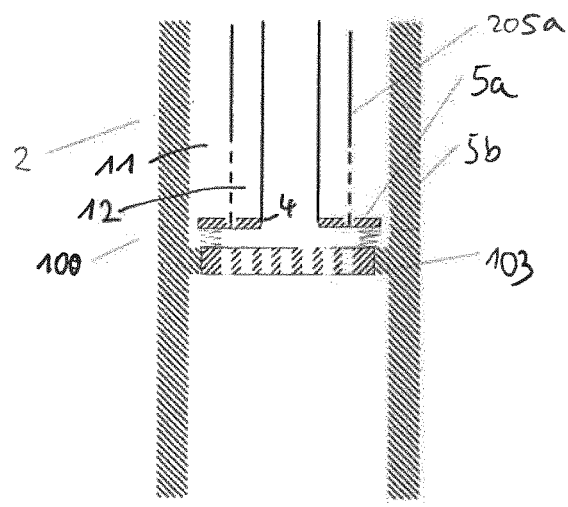
FIG. 9 shows a schematic partial longitudinal cross-section of a fifth embodiment of a catalyst tube assembly according to an aspect of the invention.

FIG. 9 shows a schematic partial longitudinal cross-section of a fifth embodiment of a catalyst tube assembly according to an aspect of the invention. In analogy with the embodiment of FIG. 8, the protruding element 103 is again a catalyst grid in the present embodiment. Contrary to the preceding embodiments, there is not a single sealing member 5, but two sealing members 5a and 5b. A first sealing member 5a may for example be a ring-like sealing member, in analogy with the sealing member in the embodiment of FIG. 7. The sealing member 5a is attached to an outlet end 4 of the inner tube 2. A second sealing member 5b, for example of a cylindrical shape, can then be in sealing engagement with said first sealing member 5a and with the protruding element 103, which in combination allows a sealing of the first annular channel 11.

Figure 10:
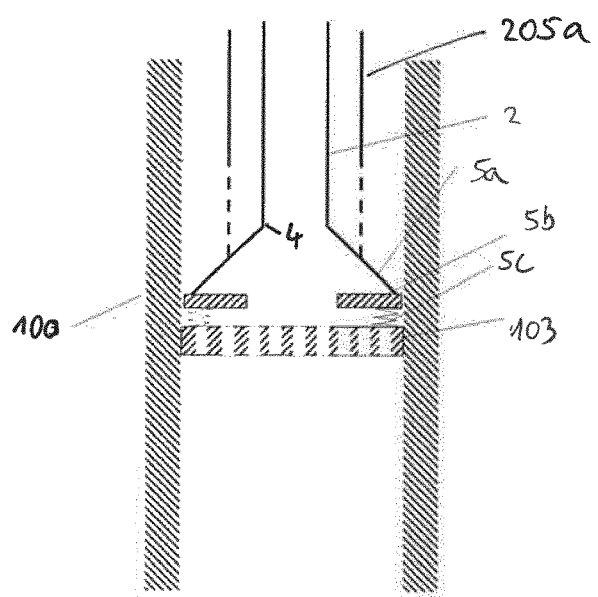
FIG. 10 shows a schematic partial longitudinal cross-section of a sixth embodiment of a catalyst tube assembly according to an aspect of the invention.

FIG. 10 shows a schematic partial longitudinal cross-section of a sixth embodiment of a catalyst tube assembly according to an aspect of the invention. In this embodiment, there are even three sealing members 5a, 5b and 5c. A first sealing member 5a can be of a conical shape, of which a narrow side may be attached to the outlet end 4 of the inner tube 2, a second sealing member 5b may be of a ring-like shape, and in sealing engagement with a wide side of the conical sealing member 5a, and a third sealing member 5c may for example be of a cylindrical shape, sealingly engaging both the ring-like sealing member 5b and the protruding element 103. So in case of a plurality of sealing members, one of the sealing members is attached to an outlet end 4 of the inner tube 2, and is in sealing engagement with a further sealing member that is either in sealing engagement with the protruding element or with still another sealing member. In other words, the sealing between the inner tube and the protruding element may be obtained by one or more sealing members, in particular by a succession of sealing members. Not every sealing member is in direct contact with both the inner tube and the protruding element, but rather the assembly of sealing members is in sealing engagement with both an outlet end of the inner tube and the protruding element. Other combinations of sealing members are possible as well, and embodiments presented here for new tubes without catalyst grids may be used with catalyst grids, and vice versa.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. Method of loading a tubular reactor with a catalyst tube assembly comprising:
providing a tubular reactor, including an outer reactor tube having an inlet end and an outlet end opposite the inlet end, and including an inwardly protruding element;
providing a tubular boundary having a closed end and an open end;
providing a centering assembly including an inner tube having an inlet end and an outlet end, wherein the outlet end of the inner tube includes at least one sealing member;
providing annular catalyst structures;
mounting said annular catalyst structures around said tubular boundary;
inserting said centering assembly substantially coaxially into the outer reactor tube until the at least one sealing member engages the inwardly protruding element, wherein the centering assembly is inserted into the outer reactor tube before the tubular boundary is mounted over the centering assembly; and mounting said tubular boundary substantially coaxially over said centering assembly.

2. Method according to claim 1, wherein the tubular boundary is mounted over the centering assembly before the centering assembly is inserted into the outer reactor tube.

3. Method according to claim 1, wherein the annular catalyst structures are mounted around the tubular boundary before mounting said tubular boundary over the centering assembly.

4. Method according to claim 1, wherein the tubular boundary is mounted over the centering assembly before the annular catalyst structures are mounted around the tubular boundary.

5. Method according to claim 1, wherein ring-shaped elements are mounted around the catalyst structures radially compressing said annular catalyst structures.

6. Method according to claim 5, wherein the ring-shaped elements are removed or destructed after insertion into the outer reactor tube of the tubular boundary on which the annular catalyst structures are mounted.

7. Method of unloading a catalyst tube assembly from a tubular reactor comprising:
providing a tubular reactor loaded with a catalyst tube assembly following
the method according to claim 1;
removing, in particular sliding out, the tubular boundary from the tubular reactor, in particular from the outer reactor tube;
removing, in particular, sliding out, the centering assembly from the tubular reactor, in particular from the outer reactor tube.

8. Method according to claim 7, wherein removing the tubular boundary causes the centering assembly to be removed as well.

9. Catalyst tube assembly for loading a tubular reactor, comprising:
an outer reactor tube having an inlet end and an outlet end opposite the inlet end, and including an inwardly protruding element, the catalyst tube assembly comprising:
a centering assembly including an inner tube having an inlet end and an outlet end;
a tubular boundary having a closed end and an open end, wherein the tubular boundary is mounted over the centering assembly; and
wherein the tubular boundary is configured to extend substantially coaxially within the outer reactor tube and substantially coaxially around the inner tube, such that the catalyst tube assembly includes a first annular channel between the outer reactor tube and the tubular boundary that is arranged for containing an annular catalyst structure, and a second annular channel between the tubular boundary and the inner tube, wherein the second annular channel is in fluid connection with the first annular channel near the open end of the tubular boundary, and in fluid connection with the inner tube at the closed end of the tubular boundary wherein the outlet end of the inner tube includes at least one sealing member configured to be in sealing engagement with the inwardly protruding element of the outer reactor tube.

10. Catalyst tube assembly according to claim 9, wherein the protruding element is a catalyst grid.

11. Catalyst tube assembly according to claim 9, wherein the at least one sealing member has a conical shape, a ring-like shape, or a cylindrical shape.

12. Catalyst tube assembly according to claim 9, wherein an external diameter of the at least one sealing member is smaller than an internal diameter of the outer reactor tube near the inwardly protruding element.

13. Catalyst tube assembly according to claim 9, wherein the inner tube includes spacers mounted on an external side of the inner tube and configured to maintain a gap between the inner tube and the tubular boundary.

14. Catalyst tube assembly according to claim 9, wherein the tubular boundary is fixedly attached to the at least one sealing member.

15. The method of claim 1, wherein the tubular reactor is a steam reformer.

16. Method according to claim 1, wherein the annular catalyst structures are mounted around the tubular boundary before mounting said tubular boundary over the centering assembly.

17. Method according to claim 2, wherein the annular catalyst structures are mounted around the tubular boundary before mounting said tubular boundary over the centering assembly.

18. Method according to claim 1, wherein the tubular boundary is mounted over the centering assembly before the annular catalyst structures are mounted around the tubular boundary.

19. Method according to claim 2, wherein the tubular boundary is mounted over the centering assembly before the annular catalyst structures are mounted around the tubular boundary.

20. Method of loading a tubular reactor with a catalyst tube assembly comprising:
providing a tubular reactor, including an outer reactor tube having an inlet end and an outlet end opposite the inlet end, and including an inwardly protruding element;
providing a tubular boundary having a closed end and an open end;
providing a centering assembly including an inner tube having an inlet end and an outlet end, wherein the outlet end of the inner tube includes at least one sealing member;
providing annular catalyst structures;
mounting said annular catalyst structures around said tubular boundary;
inserting said centering assembly substantially coaxially into the outer reactor tube until the at least one sealing member engages the inwardly protruding element; and
mounting said tubular boundary substantially coaxially over said centering assembly, wherein the annular catalyst structures are mounted around the tubular boundary before mounting said tubular boundary over the centering assembly.

* * * * *